(12) United States Patent
Blumberg et al.

(10) Patent No.: US 7,146,541 B2
(45) Date of Patent: Dec. 5, 2006

(54) BACK OUT PROVISION FOR FAILED PROGRAMMABLE HARDWARE UPDATE

(75) Inventors: Marc R. Blumberg, Berwyn, IL (US); Michael J. Kalscheur, Wheaton, IL (US); Matteo Palitto, Lisle, IL (US); Douglas W. Sturm, Wheaton, IL (US); William F. Pranaitis, Jr., St. Charles, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 460 days.

(21) Appl. No.: 10/441,700

(22) Filed: May 20, 2003

(65) Prior Publication Data

US 2004/0236998 A1     Nov. 25, 2004

(51) Int. Cl.
*G06F 11/00* (2006.01)
(52) U.S. Cl. ....................................... 714/38
(58) Field of Classification Search .................. 714/37, 714/38, 36, 6, 725; 713/2; 717/168–173
See application file for complete search history.

(56) References Cited

U.S. PATENT DOCUMENTS

| | | | | |
|---|---|---|---|---|
| 5,210,854 A | * | 5/1993 | Beaverton et al. .......... | 717/174 |
| 5,498,975 A | * | 3/1996 | Cliff et al. ..................... | 326/10 |
| 5,684,944 A | * | 11/1997 | Lubbers et al. ................ | 714/6 |
| 5,826,075 A | * | 10/1998 | Bealkowski et al. ......... | 713/187 |
| 6,009,500 A | * | 12/1999 | Rossi ........................... | 711/162 |
| 6,438,749 B1 | * | 8/2002 | Chamberlain ............... | 717/174 |
| 6,584,559 B1 | * | 6/2003 | Huh et al. ..................... | 713/2 |
| 6,640,334 B1 | * | 10/2003 | Rasmussen .................. | 717/171 |
| 6,883,109 B1 | * | 4/2005 | Erickson et al. ............... | 714/5 |
| 6,907,602 B1 | * | 6/2005 | Tsai et al. .................... | 717/168 |
| 6,944,854 B1 | * | 9/2005 | Kehne et al. ................ | 717/168 |
| 2004/0103347 A1 | * | 5/2004 | Sneed et al. .................. | 714/32 |

* cited by examiner

*Primary Examiner*—Robert Beausoliel
*Assistant Examiner*—Amine Riad (57) ABSTRACT

An apparatus and method for providing a back out routine for a failed programmable hardware update is provided. In one embodiment, the method includes: a) storing a new software image for the programmable device associated with the hardware update, b) storing a previous software image for the programmable device, c) programming the programmable device to operate according to the new software image, d) determining if there is a failure associated with the programming step, and e) if a failure is identified, programming the programmable device to operate according to the previous software image, otherwise the hardware update to the programmable device was successful. In one aspect, the back out routine is provided for a program load failure. In another aspect, the back out routine is provided for a programmable device failure.

22 Claims, 5 Drawing Sheets

BACK OUT PROVISION FOR FAILED PROGRAMMABLE HARDWARE UPDATE

BACKGROUND OF INVENTION

The invention generally relates to a programmable device and, more particularly, to an apparatus and method for providing a back out routine for a failed programmable hardware update in the programmable device and will be described with particular reference thereto. However, it is to be appreciated that the invention is also amenable to other applications.

A field programmable gate array (FPGA) is a type of integrated circuit consisting of an array of programmable logic blocks interconnected by programmable routing resources and programmable I/O cells. Programming of these logic blocks, routing resources and I/O cells is selectively completed to make the necessary interconnections that establish a configuration thereof to provide desired system operation/function for a particular circuit application.

FPGAs and similar programmable devices permit software updates (SUs) for various systems to include hardware updates. When an FPGA that is integral to system communications is affected by one such hardware update, completion of installation and/or testing of the SU may be inhibited if, during the hardware update, a program load failure is experienced or if the FPGA hardware update fails.

For example, the use of FPGAs in the design of an optical facility interface (OFI) of an optical interface unit (OIU) in a telecommunication switch makes it easy to update the OFI hardware in the field by including the FPGA software image as part of the OFI's resident software (RSW) image. The OFI-IP (Internet Protocol) typically takes advantage of three FPGAs. The reset and communication controls to the OFI are carried over one such FPGA—namely, the Time-Division Multiplexer (TDM) FPGA. Thus, a program load failure or a "bad" software update associated with the TDM FPGA could potentially leave the OFI in a state from which it cannot recover without manual intervention.

There is a particular need for a back out provision when a planned programmable hardware upgrade, such as the TDM FPGA in the OFI, fails to load properly or leaves the system (e.g., telecommunication switch) or device (e.g., OFI) in a state requiring manual intervention.

BRIEF SUMMARY OF INVENTION

In one aspect of the invention, a method of for backing out of a hardware update to a programmable device when a program load failure is detected is provided. The method includes: a) storing a new software image for the programmable device associated with the hardware update, b) storing a previous software image for the programmable device, c) programming the programmable device with the new software image, d) determining if a program load failure occurred in conjunction with programming step c), and e) if a program load failure is determined, programming the programmable device with the previous software image.

In another aspect of the invention, a method for backing out of a hardware update to a programmable device when a subsequent programmable device failure is detected is provided. The method includes: a) storing a new software image for the programmable device associated with the hardware update, b) storing a previous software image for the programmable device, c) programming the programmable device with the new software image, d) determining if the programmable device is operational after the hardware update, and e) if a programmable device failure is identified, programming the programmable device with the previous software image, otherwise the hardware update to the programmable device was successful.

In still another aspect of the invention, a method for backing out of a hardware update to a programmable device when a failure is detected is provided. The method includes: a) storing a new software image for the programmable device associated with the hardware update, b) storing a previous software image for the programmable device, c) programming the programmable device to operate according to the new software image, d) determining if there is a failure associated with the programming step, and e) if a failure is identified, programming the programmable device to operate according to the previous software image, otherwise the hardware update to the programmable device was successful.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

Figure 1:
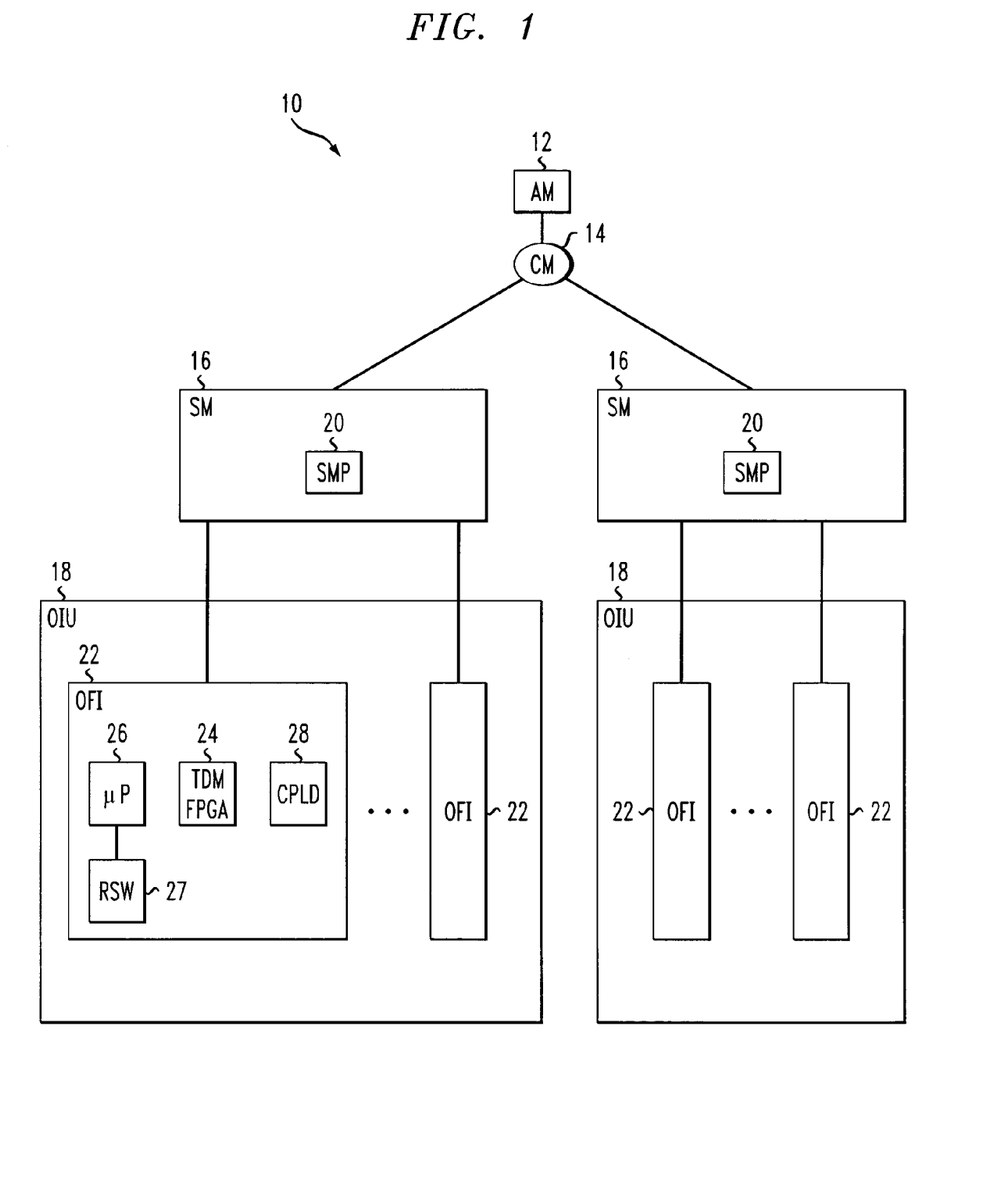
FIG. 1 is a block diagram of an embodiment of a telecommunication switch incorporating the invention.

With reference to FIG. 1, a telecommunication switch 10 (e.g., the 5ESS® Switch manufactured by Lucent Technologies) includes an administrative module (AM) 12, a communication module (CM) 14, one or more switching modules (SMs) 16 (e.g., the SM-2000 manufactured by Lucent Technologies), and may optionally include one or more optical interface units (OIUs) 18 associated with each SM. Each SM 16 includes a switching module processor (SMP) 20. Each OIU 18 includes at least one optical facility interfaces (OFI) 22. Each OFI 22 includes a time-division multiplexer field programmable gate array (TDM FPGA) 24, a microprocessor (μP) 26, a resident software (RSW) module 27 and a complex programmable logic device (CPLD) 28.

The switch 10 is a component of a telecommunication system and is a multipurpose, highly flexible, modular platform providing an interface based on open architecture. The switch 10 provides switching, signaling, and administrative functions for both landline and wireless telecommunication services. The AM 12 is the central processing unit in the switch 10. The AM 12 collects data on operations, administrative and maintenance data, and provides an interface to operating staff. The AM 12 monitors network status, allocates global system resources and supports external interfaces.

The CM 14 provides a network backbone within the switch 10 and allows communications between the AM 12 and SMs 16. The CM 14 passes messages between SMs 16 and between SMs and the AM 12. The SMs 16 provide the switch 10 with distributed processing. A given SM 16 is responsible for the bulk of call processing activities for peripherals connected to the SM. The SMs 16 terminate voice and signaling links to the public network and base stations through such peripherals. In addition, the SMs 16 handle hardware and software upgrades without disrupting subscriber service.

The OIU 18 is one type of high speed, high capacity peripheral connected to a given SM 16. Each OIU 18 provides an interface between an SM 16 and an external network architecture serving a plurality of subscribers. For example, an OIU 18 may interface with internet protocol (IP), synchronous digital hierarchy (SDH), or synchronous optical network (SONET) networks via synchronous transport module (STM)-1 or optical carrier (OC)-3 interfaces. The OIU 18 provides a high capacity link between the switch 10 and any transmission network equipment in the telecommunication system. The invention is a hardware-software algorithm that permits the switch 10 to automatically recover from a bad TDM FPGA image update.

More specifically, in the embodiment being described, the invention is associated with the SMP 20 and the OFI 22. In this embodiment, the invention is independent of both the AM and CM. Therefore, the invention can be incorporated in various other switches that include various types of AM and/or CM components or that combine the AM, CM, and/or SM functions in any combination of component configurations. The invention also can be implemented in any other type of peripheral interface and associated processor combination in any type of telecommunication switch. Moreover, the invention can be implemented in any type of electronic equipment that includes a programmable device (e.g., an FPGA).

Figure 2:
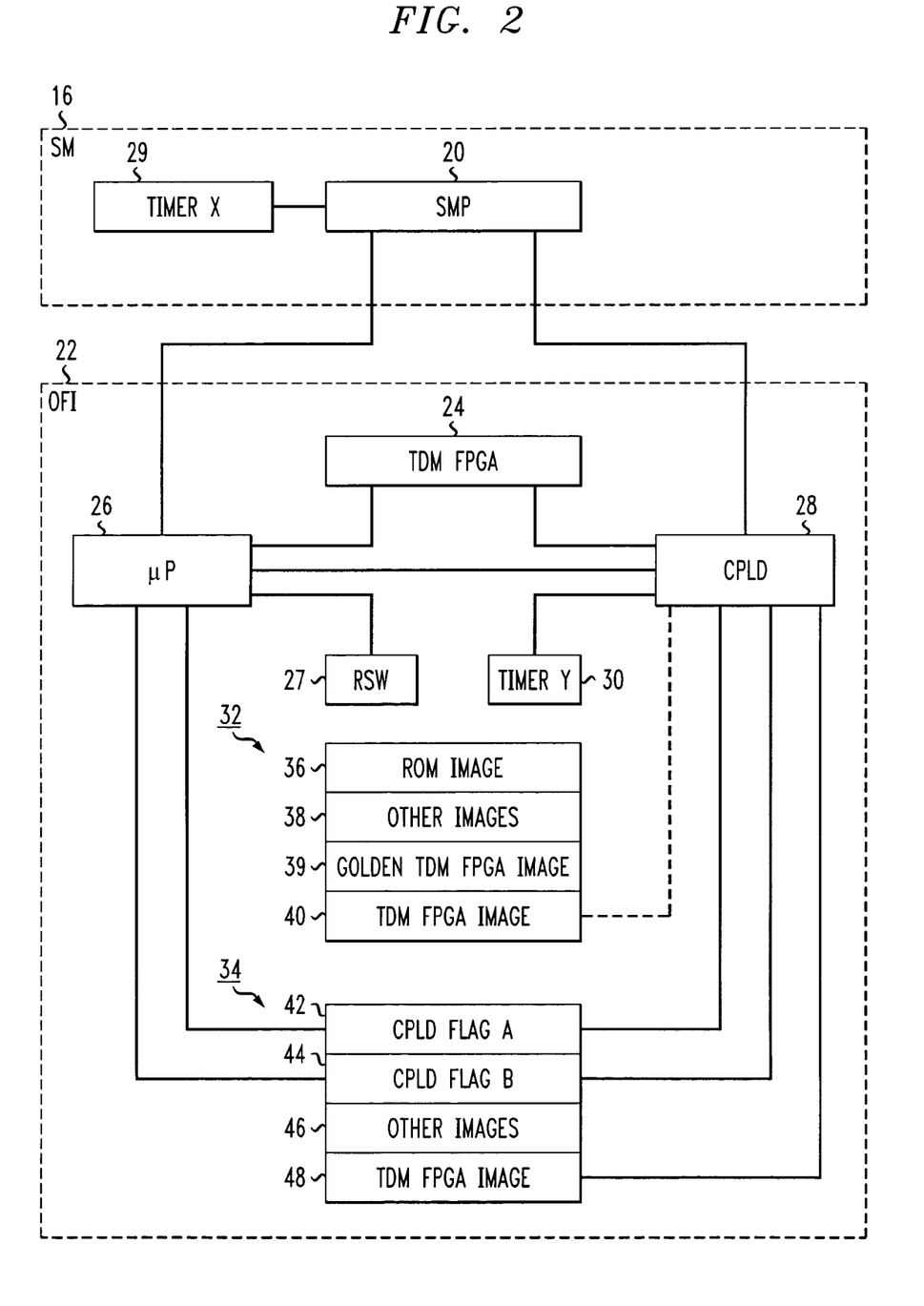
FIG. 2 is a block diagram of an embodiment of a switching module (SM) and optical facility interface (OFI) combination of a telecommunication switch incorporating the invention.

With reference to FIG. 2, an embodiment of an SM 16 incorporating the invention includes the SMP 20 and a timer X 29. An embodiment of an OFI 22 incorporating the invention includes the TDM FPGA 24, μP 26, RSW module 27, CPLD 28, a timer Y 30, a first flash memory 32, and a second flash memory 34. Each flash memory is a bank of electrically erasable programmable read only memory (EEPROM). The first flash memory 32 is allocated for storage of a read only memory (ROM) software image 36, other software images 38, a "golden" TDM FPGA software image, and a first TDM FPGA software image 40. The second flash memory 34 is allocated for storage of CPLD flag A 42, CPLD flag B 44, other software images 46, and a second TDM FPGA software image 48. Collectively, the software stored in the OFI ROM and RAM is referred to as the RSW 27. The RSW 27 is the executable software residing in the OFI. The μP 26 physically executes the instruction codes that make up the RSW 27. Of course, any software component can be stored in either flash memory and physically both first and second flash memories 32, 34 can be banks of storage locations within the same device or multiple devices.

The μP 26 includes a processor, a ROM, and a RAM. The ROM stores an operational version of the ROM software image 36. The first and second TDM FPGA software images 40, 48 contain the "current" TDM FPGA software image programmed in the TDM FPGA and the "previous" TDM FPGA software image. The RSW determines which version of the TDM FPGA software image the first and second flash memories 32, 34 contain by reading the value stored in CPLD flag B 44. For example, if CPLD flag B 44 is "0," the "current" version is stored in the first flash memory 32 and the "previous" version is stored in the second flash memory 34. Conversely, for this example, if CPLD flag B 44 is "1," the "current" version is stored in the second flash memory 34 and the "previous" version is stored in the first flash memory 32. Of course, opposite logic for the value stored in CPLD flag B 44 works just as well. CPLD flag A 42 is set to "1" when a software update (SU) includes a "new" TDM FPGA software image (i.e., effectively a TDM FPGA hardware update). Otherwise, CPLD flag A 42 is "0." Of course, like for CPLD flag B, opposite logic for the value stored in CPLD flag A 42 works just as well. The "golden" TDM FPGA software image is programmed and loaded at the factory. The "golden" TDM FPGA software image is preferably never allowed to change.

Referring to FIGS. 1 and 2, the invention is associated with a SU to the switch 10 that includes a "new" TDM FPGA software image that updates the TDM FPGA hardware. When the switch 10 receives the SU, a new perf.out is typically applied to the AM 12 and communicated to the SM 16. Each OFI 22 that is affected is pumped by the SMP 20, as are other pumpable peripherals, during the SOAK interval for the SU via the PMP:PERPH command. Pump software associated with the SMP 20 pumps the latest hash-sum tables to the OFI 22. The RSW associated with the μP 26 checks to see which parts of the software image are "new" and requests a pump of those parts from the SMP 20.

Assuming the SU includes a "new" TDM FPGA software image, once the "new" TDM FPGA software image is pumped, the RSW associated with the μP 26 of the corresponding OFI(s) updates the TDM FPGA software image corresponding to the "previous" software image with the "new" software image. The RSW also sets CPLD flag A 42 to indicate there is a new image. The RSW also toggles CPLD flag B 44 so that the flash memory (32 or 34) storing the "new" software image is identified as the "current" software image and the prior "current" software image stored in the other flash memory (34 or 32) is identified as the "previous" software image.

If the RSW associated with the μP 26 of the corresponding OFI(s) determines that the TDM FPGA software image was just updated, the RSW requests an additional circuit pack reset from the SMP 20 so that re-programming of the TDM FPGA with the "new" software image can take effect. The invention provides a safe back out if the "new" TDM FPGA software image is corrupted in some way during loading or initial operation.

Figure 3:
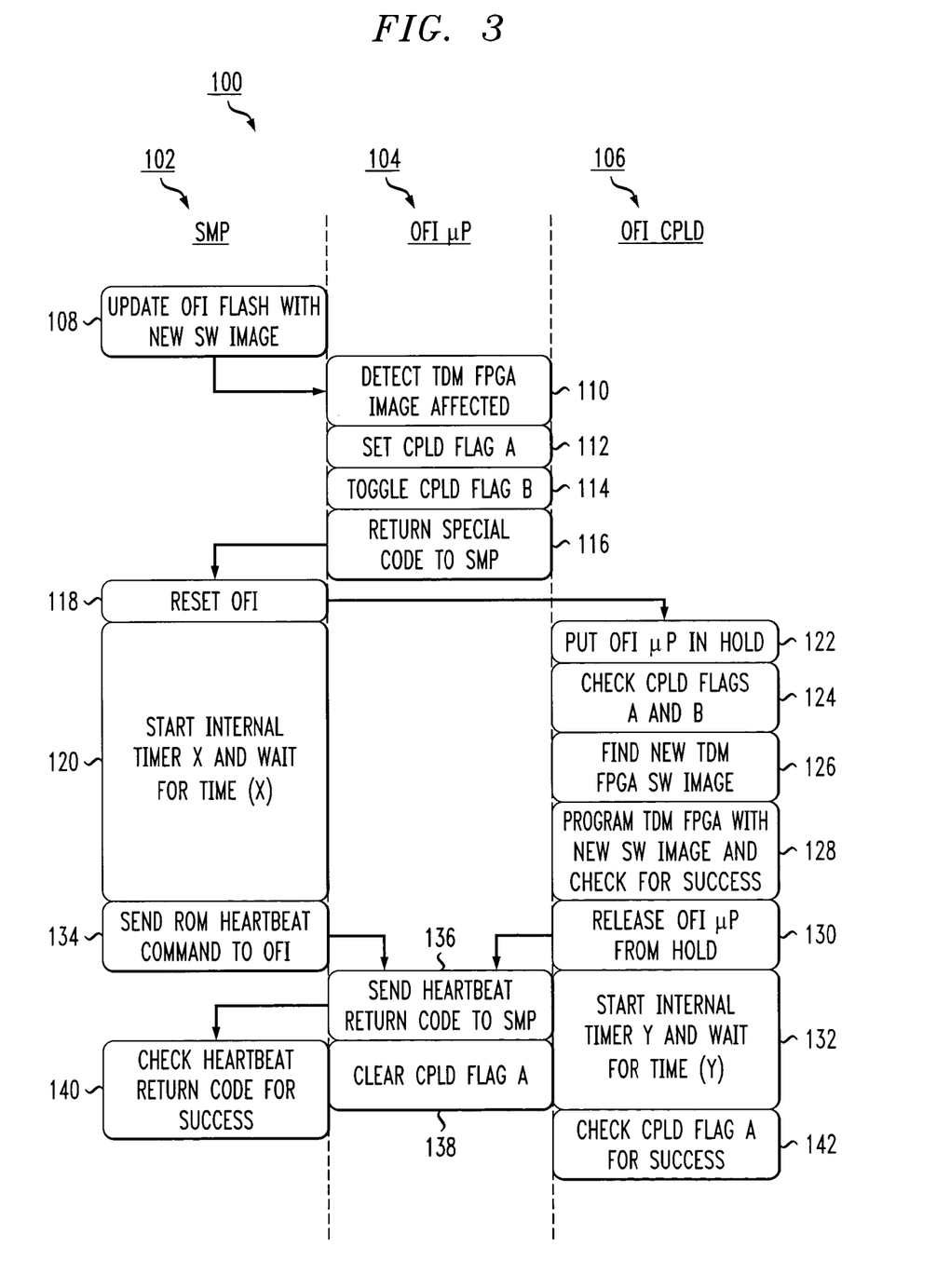
FIG. 3 is a flow chart of an embodiment of a method for installing a programmable hardware update in a field programmable gate array (FPGA) associated with an SM and OFI combination of a telecommunication switch incorporating the invention.

With reference to FIG. 3, an embodiment of a normal (i.e., success-oriented) TDM FPGA hardware update process 100 is depicted in a flow chart that advances from step 102 through various steps performed by the SMP 20, the μP 26, or the CPLD 28. The SMP-performed steps are reflected in the left column 102, μP-performed steps in the middle column 104, and CPLD-performed steps in the right column 106.

At the outset, an SU that includes a "new" software image for an OIU 18 (i.e., peripheral) is applied to an SM 16. At the pump peripheral command, the SM 16 removes and restores OFIs 22 associated with the OIU 18, pumping "new" software image sections instead of the usual pump from flash memory. After pumping the "new" software image sections down, hash check commands are performed.

The RSW detects that the "new" TDM FPGA software image is affected during the flash memory update (step 110). In step 112, the RSW sets the CPLD flag A to indicate a "new" TDM FPGA software image is available in flash memory for loading in the TDM FPGA to perform an FPGA hardware update. Next, the RSW toggles CPLD flag B to indicate that the "current" TDM FPGA software image is the "new" software image just sent down by the SMP and that the prior "current" software image is the "previous" software image (step 114). In step 116, the RSW returns a special code to the SMP to indicate an additional OFI reset is required in order to re-program the TDM FPGA.

Next, the SMP resets the OFI (step 118). At step 120, the SMP starts internal timer X and waits for a predetermined time (X) to elapse. For example, X may be set to about 250 ms.

On the OFI reset, the CPLD puts the OFI μP in hold (step 122). At step 124, the CPLD checks CPLD flag A to determine if it needs to re-program the TDM FPGA and checks CPLD flag B to determine where the "new" or "current" TDM FPGA software image is stored. Next, the CPLD finds the "current" TDM FPGA software image in the flash memory specified by CPLD flag B (step 126). At step 128, the CPLD programs the TDM FPGA with the "new" or "current" software image and checks success. Typically, this can take up to X (i.e., about 250 ms). If successful, the CPLD releases the OFI μP from hold, permitting the OFI μP to continue to execute the RSW from ROM (step 130). At step 132, the CPLD starts internal timer Y and waits for a predetermined time (Y) to elapse. For example, Y may be set to about 3–6 seconds.

After internal timer X has elapsed, the SMP sends a ROM heartbeat command to the RSW (step 134). At step 136, after the CPLD releases the OFI μP from hold, in response to the ROM heartbeat command, the RSW retrieves the TDM FPGA version from a version indicator sends a return code to the SMP indicating whether the "current" or "previous" TDM FPGA software image is loaded in the TDM FPGA hardware. For example, if the "current" TDM FPGA software image is loaded, the return code may be "0." Conversely, if the "previous" software image is loaded, the return code may be "1." Of course, opposite logic for the return code works just as well. Next, the OFI RSW clears CPLD flag A to indicate that there is no longer a "new" TDM FPGA software image ready for loading (step 138).

At step 140, the SMP checks the return code from the ROM heartbeat command to determine success or failure with respect to the TDM FPGA hardware update. After internal timer Y has elapsed, the CPLD checks CPLD flag A to determine success or failure with respect to the TDM FPGA hardware update (step 142). Assuming both checks are successful, the TDM FPGA hardware update is successful and the OFI 22 associated with the update is operational.

Figure 4:
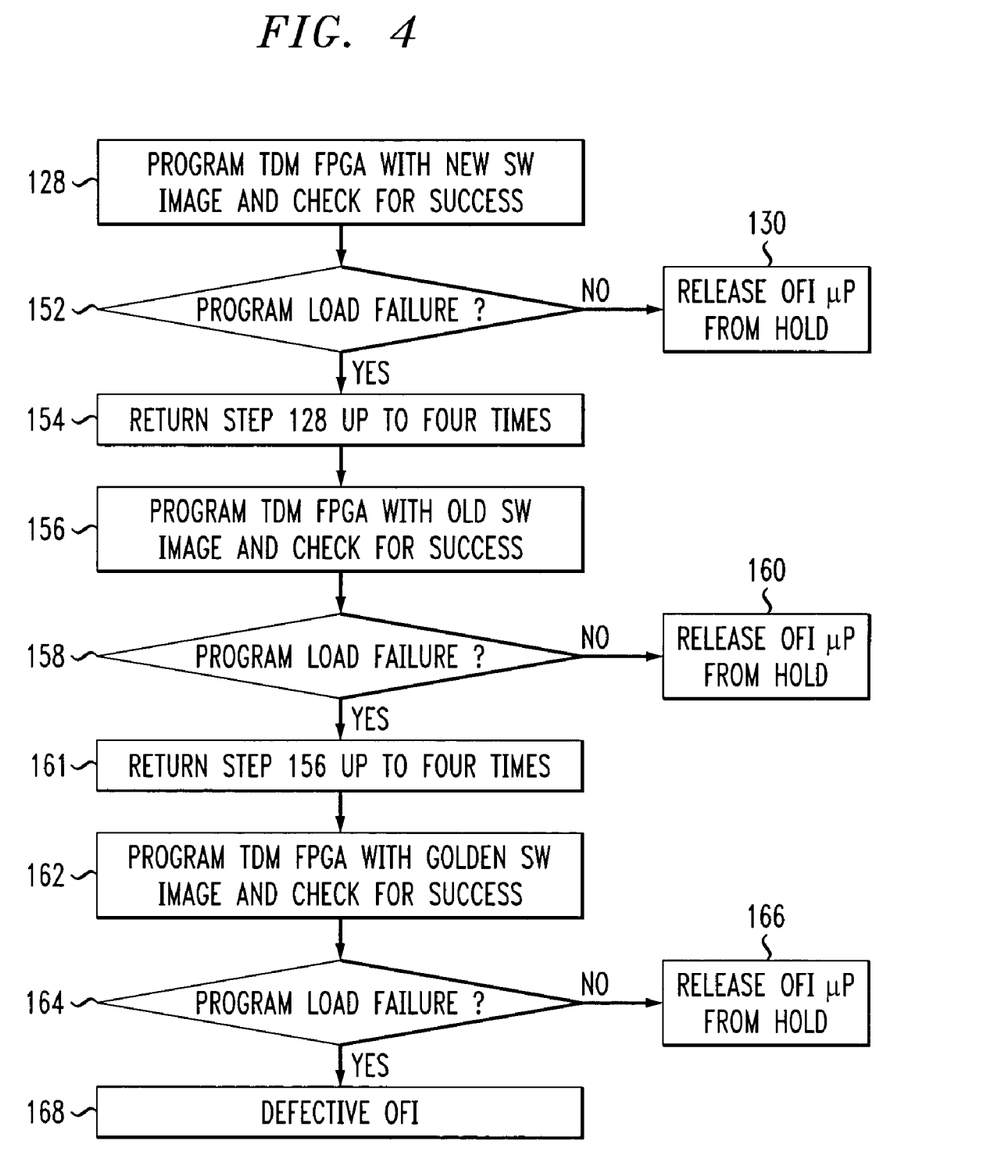
FIG. 4 is a flow chart of an embodiment of a back out provision for the method of FIG. 3 when a "new" software image fails to load properly in the FPGA.

One aspect of the invention provides a back out provision if the "new" TDM FPGA software image fails to load properly in the TDM FPGA. With reference to FIG. 4, a block diagram of the back out provision for program load failures 150 begins at step 128 of the success-oriented diagram (FIG. 3) when the check for success is performed after programming the TDM FPGA with the "new" software image. At step 152, the results of the success check are evaluated to determine if there was a program load failure. If there was no program load failure, the CPLD releases the OFI μP from hold, permitting the OFI μP to continue to execute the RSW from ROM (step 130, as shown in FIG. 3). At this point, a TDM FPGA version indicator (e.g., version register) is updated to indicate that a new version is available to the RSW. For example, a version register may be cleared (i.e., "0"). Of course, opposite logic (i.e., setting the version register to a "1") works just as well.

However, if a program load failure was identified, the process returns to step 128 and the CPLD attempts to load the "new" software image again (step 154). The CPLD will return to retry loading the "new" software image up to four times. After the last try, if the "new" software image would not load properly, the process advances to the next step.

At step 156, the CPLD attempts to load the TDM FPGA with the "previous" or "old" software image and checks for success. At step 158, the results of the success check are evaluated to determine if there was a program load failure. If there was no program load failure, the CPLD releases the OFI μP to continue to execute the RSW from ROM (step 160). However, if a program load failure was identified, the process returns to step 156 and the CPLD attempts to load the "old" software image again (step 161). The CPLD will return to retry loading the "old" software image up to four times. After the last try, if the "old" software image would not load properly, the process advances to the next step.

At step 162, the CPLD attempts to load the TDM FPGA with the "golden" software image and checks for success. At step 164, the results of the success check are evaluated to determine if there was a program load failure. If there was no program load failure, the CPLD releases the OFI μP to continue to execute the RSW from ROM (step 166). However, if a program load failure was identified, the OFI is defective because it is not able to load a software image in the TDM FPGA (step 168).

Figure 5:
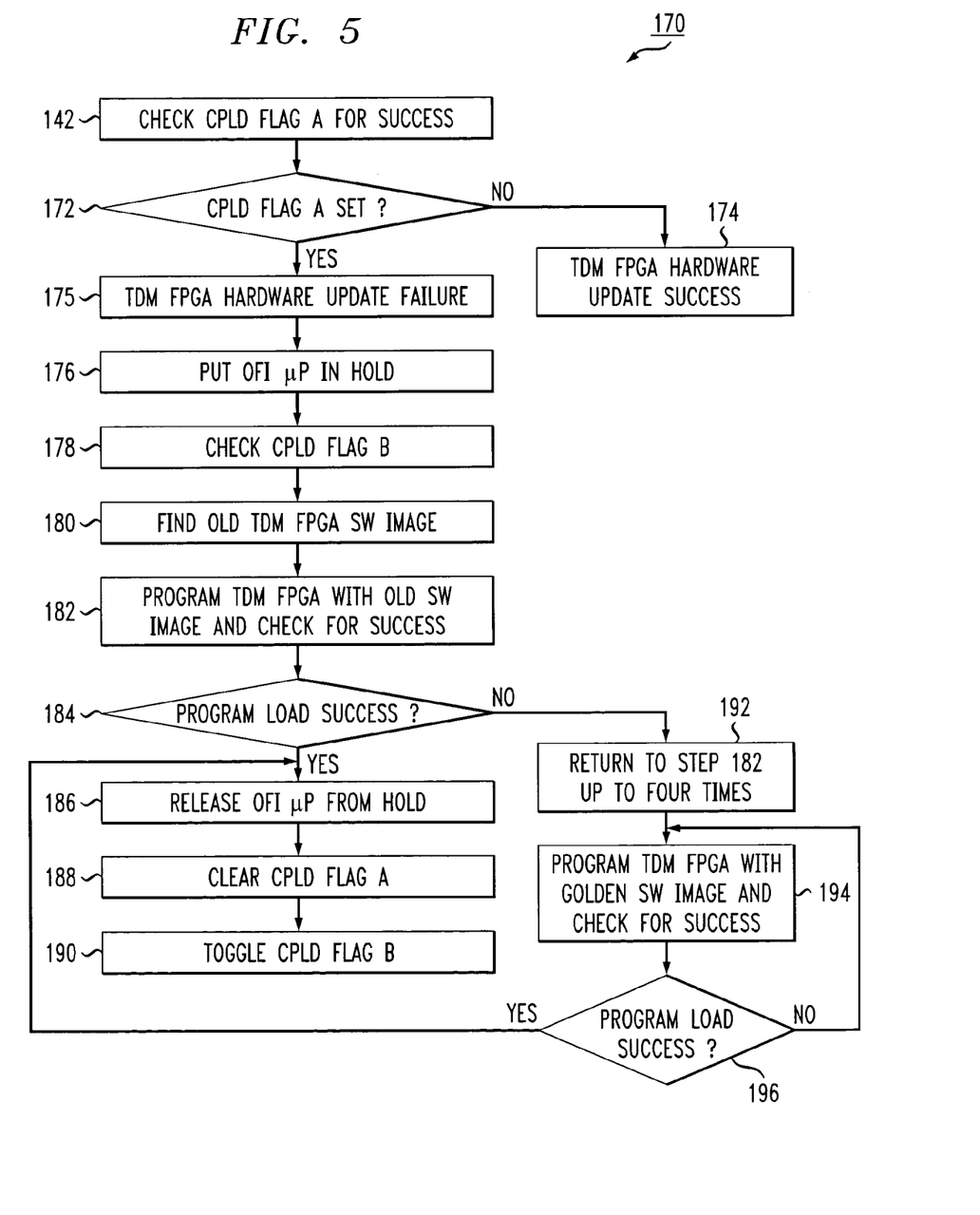
FIG. 5 is a flow chart of an embodiment of a back out provision for the method of FIG. 3 when the FPGA fails to operate properly after the hardware update (i.e., after the "new" software image is loaded).

Another aspect of the invention provides a back out provision if the TDM FPGA fails to operate properly after the hardware update (i.e., after the "new" TDM FPGA software image is loaded). Typically, a hardware update failure indicates that the "new" software image has a bug that inhibits operation. With reference to FIG. 5, a block diagram of a back out provision for TDM FPGA operational failures 170 begins at step 142 of the success-oriented diagram (FIG. 3) when CPLD flag A is checked for success of the hardware update. At step 172, the CPLD checks to see if the CPLD flag A is set. If step 136 (FIG. 3) was performed, CPLD flag A should be cleared. If CPLD flag A is not set (i.e., cleared), the TDM FPGA hardware update was a success (step 174).

However, if CPLD flag A is set, the SMP was not permitted to communicate with the OFI and step 138 (FIG. 3) was not performed. In other words, the TDM FPGA hardware update failed (step 175). In step 176, the CPLD puts the OFI μP on hold. Next, the CPLD checks CPLD flag B to determine where the "old" or "previous" TDM FPGA software image is stored (step 178). In step 180, the CPLD finds the "previous" TDM FPGA software image in the flash memory specified by CPLD flag B. Next, the CPLD programs the TDM FPGA with the "old" or "previous" software image and checks for success (step 182). At step 184, the results of the success check are evaluated to determine if the program load was successful. If the program load was successful, the CPLD releases the OFI μP from hold, permitting the OFI μP to continue to execute the RSW from ROM (step 186). At this point, the "new" software image would not run in the TDM FPGA. Therefore, the "new" TDM FPGA software image is presumed defective. The RSW checks the image version indicator and, finding an old version, clears CPLD flag A to indicate there is no longer a "new" TDM FPGA software image ready for loading (step 188). At step 190, the OFI RSW toggles CPLD flag B to indicate that the "current" TDM FPGA software image is the "old" software image that was in use prior to the attempted hardware update.

However, if the program load was not successful, the process returns to step 182 and the CPLD attempts to load the "previous" software image again (step 192). The CPLD will return to retry loading the "previous" software image up to four times. After the last try, if the "old" software image would not load properly, the process advances to the next step.

At step 194, the CPLD attempts to load the TDM FPGA with the "golden" software image and checks for success. At step 196, the results of the success check are evaluated to determine if the program load was successful. If the program load was successful, the CPLD releases the OFI μP from hold, permitting the OFI μP to continue to execute the RSW from ROM (step 186). At this point, the "new" software image would not run in the TDM FPGA. Therefore, the "new" TDM FPGA software image is presumed defective. The RSW checks the image version indicator and, finding an old version, clears CPLD flag A to indicate there is no longer a "new" TDM FPGA software image ready for loading (step 188). At step 190, the OFI RSW toggles CPLD flag B to indicate that the "current" TDM FPGA software image is the "golden" software image. However, if the program load was not successful, the process returns to step 194 and the CPLD attempts to load the "golden" software image again.

While the invention is described herein in conjunction with exemplary embodiments, it is evident that many alternatives, modifications, and variations will be apparent to those skilled in the art. For example, the back out provisions could be implemented for other FPGAs or other types of programmable devices anywhere in the switch 10. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

We claim:

1. A method for backing out of a hardware update to a programmable device when a program load failure is detected, the method including the steps:
 a) storing a new software image for the programmable device associated with the hardware update;
 b) storing a previous software image for the programmable device;
 c) programming the programmable device with the new software image;
 d) determining if a program load failure occurred in conjunction with programming step c); and
 e) if a program load failure is determined, programming the programmable device with the previous software image, wherein the programmable device is a field programmable gate array.

2. The method as set forth in claim 1, wherein first and second flag storage locations and first and second software image storage locations are provided, between steps a) and c), the method further including:
 f) setting the first flag to a value indicating that a new software image for updating the programmable device is available; and
 g) setting the second flag to a value indicating whether the new software image is stored in the first or the second software image storage location; between steps g) and c), the method further including:
 h) checking the value of the first flag to confirm that a new software image for updating the programmable device is available; and
 i) checking the value of the second flag to locate the new software image; end between steps d) and e), the method further including:
 j) if a program load failure is determined, checking the value of the second flag to locate the previous software image.

3. The method as set forth in claim 1, between steps d) and e), the method further including:
 f) if a program load failure is determined, returning to step c) to perform the programming and determining steps c) and d) again.

4. The method as set forth in claim 1, further including:
 f) if the programming portion of step e) was successful, returning to step c) to perform the programming and determining steps c) and d) again.

5. The method as set forth in claim 1, further including:
 f) determining if a program load failure occurred in conjunction with the programming portion of step e); and
 g) if a program load failure is determined, concluding that the hardware update cannot be accomplished.

6. The method as set forth in claim 1, wherein the field programmable gate array is associated with a peripheral interface in a telecommunication switch.

7. The method as set forth in claim 6, wherein the field programmable gate array is associated with a time-division multiplexer interface.

8. The method as set forth in claim 1, further including:
 f) determining if a program load failure occurred in conjunction with programming step e); and
 g) if a program load failure is determined, programming the programmable device with a golden software image.

9. A method for backing out of a hardware update to a programmable device when a subsequent programmable device failure is detected, the method including the steps:
 a) storing a new software image for the programmable device associated with the hardware update;
 b) storing a previous software image for the programmable device;
 c) programming the programmable device with the new software image to install the hardware update over a remote link;
 d) determining if the programmable device is operational after the hardware update; end
 e) if a programmable device failure is identified, programming the programmable device with the previous software image, otherwise the hardware update to the programmable device was successful, wherein the programmable device comprises a field programmable gate array.

10. The method as set forth in claim 9, between steps c) and d), the method further including:

f) determining if a program load failure occurred in conjunction with programming step c); and g) ifs program load failure is determined, programming the programmable device with the previous software image, otherwise continuing to step d).

11. The method as set forth in claim 10, further including:

h) determining ifs program load failure occurred in conjunction with programming step g); and i) if a program load failure is determined, programming the programmable device with a golden software image, otherwise returning to step c).

12. The method as set forth in claim 10, wherein first and second flag storage locations and first and second software image storage locations are provided, between steps a) and c) the method further including:

h) setting the first flag to a value indicating that a new software image for updating the programmable device is available; and i) setting the second flag to a value indicating whether the new software image is stored in the first or the second software image storage location;

j) checking the value of the first flag to confirm that a new software image for updating the programmable device is available; and k) checking the value of the second flag to locate the new software image; between steps f) and g), the method further including:

l) if a program load failure is determined, checking the value of the second flag to locate the previous software image;

step d) further including:

m) communicating with the programmable device to determine if the programmable device is operational after the hardware update;

n) if the programmable device is operational after the hardware update, setting the first flag to a value indicating that a new software image for updating the programmable device is no longer available; and o) checking the value of the first flag to confirm that a new software image for updating the programmable device is no longer available; between steps d) and e), the method further including:

p) if a programmable device failure is identified, checking the value of the second flag to locate the previous software image; and after step e), the method further including:

q) setting the first flag to a value indicating that a new software image for updating the programmable device is no longer available; and r) selling the second flag to a value indicating whether the previous software image is stored in the first or the second software image storage location.

13. The method as set forth in claim 10, between steps f) and g), the method further including:

h) if a program load failure is determined, returning to step c) to perform the programming and determining steps c) and f) again.

14. The method as set forth in claim 10, further including:

h) if the programming portion of step g) was successful, returning to step c) to perform the programming and determining steps c) and f) again.

15. The method as set forth in claim 10, further including:

h) determining if a program load failure occurred in conjunction with the programming portion of step g); and i) if a program load failure is determined, concluding that the hardware update cannot be accomplished.

16. A method for backing out of a hardware update to a programmable device when a subsequent programmable device failure is detected, the method including the steps:

a) storing a new software image for the programmable device associated with the hardware update;

b) storing a previous software image for the programmable device;

c) programming the programmable device with the new software image to install the hardware update;

d) determining if the programmable device is operational after the hardware update; and e) if a programmable device failure is identified, programming the programmable device with the previous software image, otherwise the hardware update to the programmable device was successful, wherein the programmable device is a field programmable gate array.

17. The method as set forth in claim 16, wherein the field programmable gate array is associated with a peripheral interface in a telecommunication switch.

18. The method as set forth in claim 17, wherein the field programmable gate array is associated with a time-division multiplexer interface.

19. The method as set forth in claim 16, further including:

f) determining if the programming portion of step e) was successful; and g) if the programming was not successful, returning to step e) to perform the programming portion again.

20. A method for backing out of a hardware update to a programmable device when a failure is detected, the method Including the steps:

a) storing a new software image for the programmable device associated with the hardware update:

b) storing a previous software image for the programmable device;

c) programming the programmable device to operate according to the new software image over a remote link;

d) determining if there is a failure associated with the programming step; and e) if a failure is identified, programming the programmable device to operate according to the previous software image, otherwise the hardware update to the programmable device was successful, wherein the programmable device comprises a field programmable gate array.

21. The method as set forth in claim 20, wherein the failure in steps d) and e) is a program load failure.

22. The method as set forth in claim 20, wherein the failure in steps d) and e) is a programmable device failure.

* * * * *